(No Model.)

E. R. KNORR.
PROJECTION OF CHARTS.

No. 264,710. Patented Sept. 19, 1882.

Witnesses

Inventor:
Ernst Rudolf Knorr

UNITED STATES PATENT OFFICE.

ERNST R. KNORR, OF WASHINGTON, DISTRICT OF COLUMBIA.

PROJECTION OF CHARTS.

SPECIFICATION forming part of Letters Patent No. 264,710, dated September 19, 1882.

Application filed June 17, 1882. (No model.)

*To all whom it may concern:*

Be it known that I, ERNST RUDOLF KNORR, of the city of Washington, in the District of Columbia, have invented a new and useful Improvement in the Projection of Charts, which improvement is fully set forth in the following specification and annexed drawings, in which—

Figure 1:
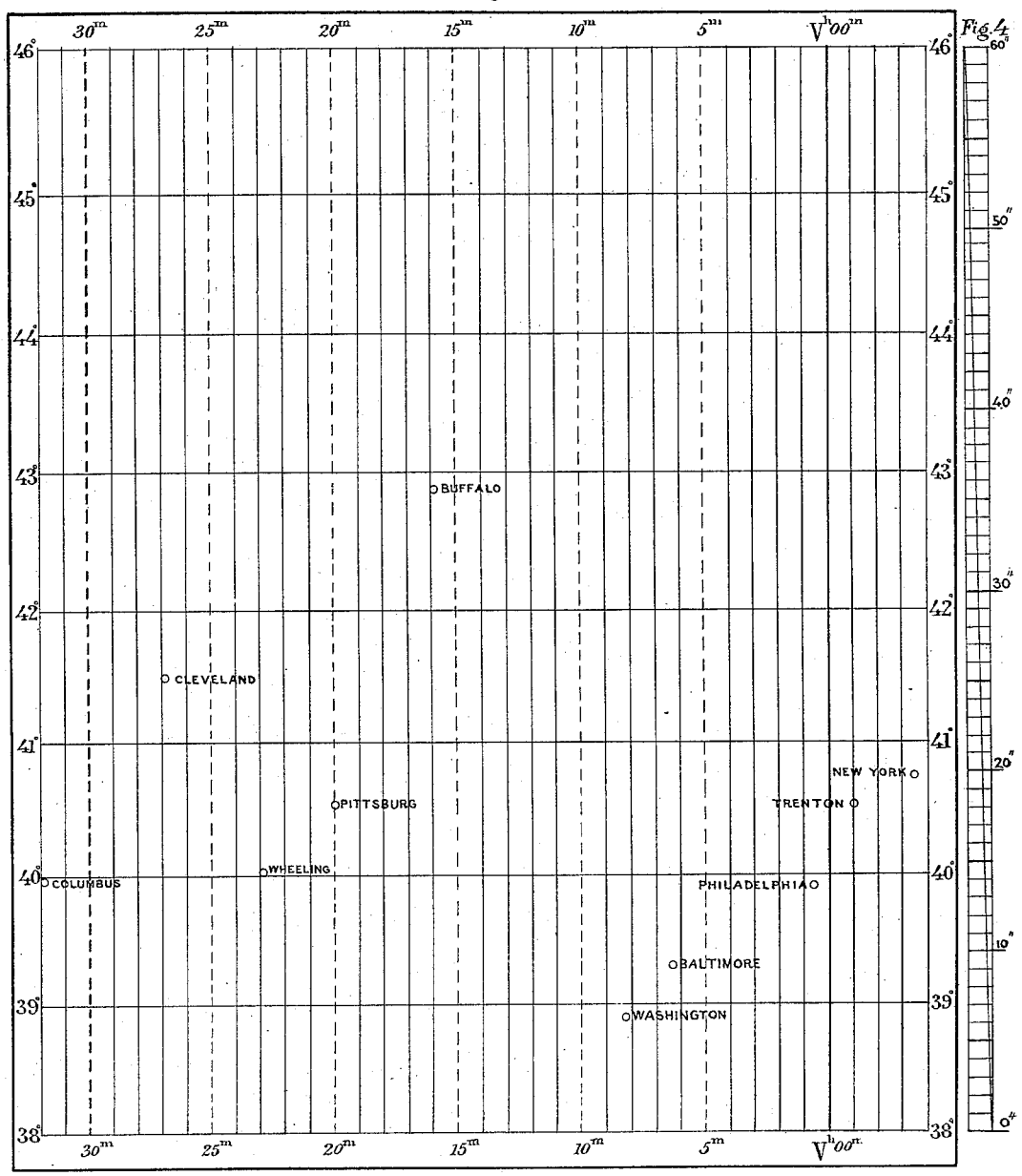
Figure 2:
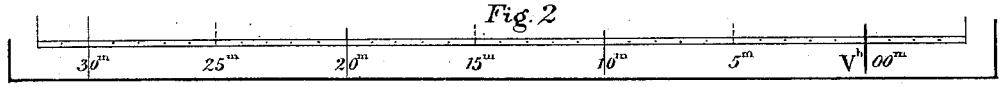
Figure 3:
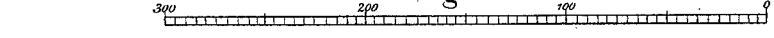

Figure 1 represents a Mercator's projection with my improvement in one form; Fig. 2, the marginal divisions of the same projection with my improvement in another form; Fig. 3, a scale of statute miles for a chart in this projection; and Fig. 4, a diagonal scale for measuring fractions of a minute of time, (seconds.)

The object of my invention is to furnish a device by which the difference in the local time of any two places on the globe can be ascertained very quickly—almost at a glance.

The Mercator's projection, Fig. 1, in the drawings is modified only in the designation of the meridians by the hour-angle (the difference of local and Greenwich time) instead of by the degrees of the longitudinal arcs. These meridians are drawn for every full minute of the sun's travel from Greenwich, and each fifth, tenth, thirtieth, and sixtieth is distinguished by a different character of the line drawn, for the purpose of facilitating the counting, by which device the longitude in Greenwich time of any place laid down on the chart can rapidly be read off to a fraction of a minute.

In order to ascertain the difference in the local time of two places, it is only required to subtract the Greenwich time (or any other standard time) so obtained of one from that of the other, or to count the meridians drawn across the chart between the two places, less one, and to add the estimated fractions of a minute between each of the places and the nearest meridian to it on the line between the two places. New York will be found to lie four hours fifty-six and one-half minutes from Greenwich; Columbus, Ohio, five hours thirty-one and three-fourths minutes. The difference in local time is therefore thirty-five and one-fourth minutes; or there are between the two places thirty-five meridians drawn; one less is thirty-four. The fraction between New York and the meridian—four hours fifty-six minutes—is one-half minute; that between the meridian—five hours thirty-one minutes—and Columbus is three-fourths of a minute, together one and one fourth minutes; added to thirty-four gives thirty-five and one-fourth minutes, as above. When these two fractions are measured by a pair of dividers on the diagonal scale, Fig. 4, the difference of time can be obtained to seconds, and (if the chart is on a larger scale) even to fractions of a second. The scale of statute miles serves to ascertain approximately the distance between any two places shown on the chart in statute miles.

Instead of adopting the meridian running through Greenwich for the primary one, any one running through another place may be selected for such, so that if, for instance, the meridian of New York is selected as the primary one, and designated as the zero or 0 hours, the hours and minutes on the upper and lower border-divisions will give directly the differences in time from New York. Any other projection (rectilinear or conic) can be adapted in the same manner for the purposes stated above by designating the meridians by their difference in time from the prime meridian.

Fig. 3 represents the upper and lower border of a chart on which the meridians are not drawn entirely across the chart for every minute of time, but having a division-mark for every minute at or near the border. The aid of a pair of dividers or of another implement will then be required to make a rapid measurement of the differences in time.

Having thus described my invention, what I claim as new, and desire to secure by Letters Patent, is—

1. A terrestrial map or chart on a plane or spherical projection, having its meridional lines named by units of hours and fractions thereof, substantially as described, and for the purpose set forth.

2. A terrestrial map or chart on a plane or spherical projection, and having its meridional lines drawn and named to indicate at a glance time in reference to an established meridian in minutes and seconds, substantially as set forth.

ERNST RUDOLF KNORR.

Witnesses:
JOHN HUNTER,
ARTHUR T. BRICE.